US010148198B2

(12) United States Patent
Johnson

(10) Patent No.: US 10,148,198 B2
(45) Date of Patent: Dec. 4, 2018

(54) ELECTROSTATIC INDUCTION GENERATOR FOR CREATING HIGH VOLTAGE DIRECT CURRENT

(71) Applicant: Electric Force Motors, LLC, Ashland, VA (US)

(72) Inventor: Weston Clute Johnson, Richmond, VA (US)

(73) Assignee: Electric Force Motors, Inc., Ashland, VA (US)

( * ) Notice: Subject to any disclaimer, the term of this patent is extended or adjusted under 35 U.S.C. 154(b) by 1063 days.

(21) Appl. No.: 14/460,462

(22) Filed: Aug. 15, 2014

(65) Prior Publication Data

US 2015/0048716 A1    Feb. 19, 2015

Related U.S. Application Data

(60) Provisional application No. 61/866,523, filed on Aug. 15, 2013, provisional application No. 61/900,996, filed on Nov. 6, 2013.

(51) Int. Cl.
*H02N 1/00* (2006.01)
*H02N 1/08* (2006.01)
*F03D 9/25* (2016.01)
*F03D 9/11* (2016.01)

(52) U.S. Cl.
CPC ............ *H02N 1/08* (2013.01); *F03D 9/25* (2016.05); *F03D 9/255* (2017.02); *F03D 9/11* (2016.05); *F05B 2220/706* (2013.01); *Y02E 10/725* (2013.01)

(58) Field of Classification Search
CPC ............ H02N 1/08; H02N 1/004; H02N 1/00
USPC ................................. 310/308, 309
See application file for complete search history.

(56) References Cited

U.S. PATENT DOCUMENTS

| 5,541,465 A * | 7/1996 | Higuchi | H02N 1/004 |
| | | | 310/268 |
| 2006/0214535 A1* | 9/2006 | Salmon | H02N 1/004 |
| | | | 310/309 |
| 2009/0066298 A1* | 3/2009 | Post | H02N 1/08 |
| | | | 322/2 A |

* cited by examiner

*Primary Examiner* — Bernard Rojas
*Assistant Examiner* — Leda Pham
(74) *Attorney, Agent, or Firm* — Troutman Sanders LLP; Ryan Schneider; Micah Hensley

(57) ABSTRACT

Systems and methods for generating a high voltage direct current using electric-field generators are disclosed. The electric field generator can comprise a rotor member, rotor poles coupled to the rotor member, stator poles corresponding to the rotor poles, and a dielectric medium positioned between the corresponding stator and rotor poles. The method can comprise applying an electric field between corresponding stator and rotor poles, receiving a mechanical energy input causing the rotor member to rotate, changing an alignment of the corresponding stator and rotor poles as a result of the rotation of the rotor member, increasing the voltage of the electric field between the corresponding stator and rotor poles as a result of the alignment change of the corresponding stator and rotor poles, and discharging the electric field to place a charge on a DC bus when the voltage of the electric field reaches a predetermined level.

18 Claims, 14 Drawing Sheets

-- PRIOR ART --

1100

1300

-- PRIOR ART --

ELECTROSTATIC INDUCTION GENERATOR FOR CREATING HIGH VOLTAGE DIRECT CURRENT

CROSS-REFERENCE TO RELATED APPLICATIONS

This application claims the benefit of U.S. Provisional Application Ser. Nos. 61/866,523, filed on 15 Aug. 2013, and 61/900,996, filed on 6 Nov. 2013 which are incorporated herein by reference in their entireties as if fully set forth below.

FIELD OF USE

The embodiments described herein relate to the design, construction, fabrication and assembly of electro-mechanical machines that primarily use electric fields and electrostatic induction as a source of force, torque or energy, and which produce or consume high voltage direct current.

BACKGROUND

Modern magnetic induction machines (e.g. motors and generators) primarily operate using rotating magnetic fields created by alternating current (AC), a technology that was first developed by in the late 1890's and which has been deployed universally for well over a century. Magnetic induction machines can operate based on the interaction of a plurality of magnetic fields, typically created by copper coils carrying current and/or permanent magnets and shaped using steel laminations, that are used to create force, torque or energy. In the century since its introduction, there have been many improvements to the magnetic machine, including copper and steel processing refinements, and the development of copper rotors and high strength rare-earth magnets, which may have been developed to improve efficiency characteristics, but which have also resulted in extra material processing. For this reason, many modern improvements can also increase manufacturing costs. After a century of development, magnetic machines may have reached their cost-performance limits.

In the late 1890's there was another magnetic field technology based on direct current (DC) promoted by Thomas Edison. As is commonly known, Edison's DC technology did not prevail commercially primarily because there was no economical method at the time to efficiently generate and transmit DC power over long distances.

In the century since Edison, the ability to generate and transmit DC power has advanced and the economics of transmitting high voltage DC (HVDC), which can be more efficient to transmit than high voltage AC (HVAC) because reactance in a DC system is minimized, has been shown to be beneficial for certain applications. However, usage of HVDC is relatively rare because the cost remains prohibitively high in most cases. These higher costs can be due to an increased number of conversions that are required for creating, transmitting and distributing HVDC as shown in FIG. 1, illustrating a prior art wind system for generating HVDC power. These conversions can be required because the source of the power is generated from AC magnetic machines, which necessitate the conversion from AC to HVDC then back to AC. The costs can include fabricating and installing HVDC converter stations; one to convert AC to HVDC and another to convert HVDC back to AC, which are based on specialized, electrically isolated semiconductor switches. Because of these costs, HVDC power has typically been used for applications requiring long-distance transmission runs or operation in challenging environments such as offshore wind farms where the improved efficiency, or other benefits from HVDC, can justify the added expense.

Nearly a century before magnetic field machines were developed, another machine technology based on electric fields was created. Just as the north-south magnetic fields of two magnets can create attractive and repulsive forces, electric fields from positive-negative charges can also create attractive and repulsive forces. For example, in 1784 Benjamin Franklin experimented with this electric field technology by building a spark-gap motor that placed electrical charges, via a charge transfer process, on thimbles attached to a wheel to create attractive-repulsive forces, causing the wheel to rotate, as described in O. Jefimenko, D. Walker, *Electrostatic Motors*, Physics Teacher, March 1971. Franklin considered his device a novelty, and nothing more, as he lacked understanding of its potential.

The origin of the electric field is the static charge, which has an inherent or innate electric field. Machines based on electric field technology (EFT) utilize this inherent electric field of static charges (i.e. electrons) for creating force, torque or energy. In contrast, magnetic field machines use current, which is the name given to charge that is in motion, to induce magnetic fields from which force, torque and energy can also be created. While electric and magnetic field machines can both create useful results, modern large power electro-mechanical machines, such as those above 100 Watts, tend to be exclusively based on magnetic fields and the principals of magnetic induction.

A primary reason for the exclusive usage of magnetic fields has been due to poor ability to contain large electric fields, whereas containing a magnetic field has been comparatively easy, due to differences between material properties known as permittivity versus permeability. The ability of a material to carry a magnetic field is characterized by the permeability of free space ($\mu_0$), as described by Equation 1 below.

$$\mu_0 = \frac{B}{H} = 4\pi * 10^{-7} \frac{H}{m}, \qquad \text{Equation 1.}$$

On the other hand, the ability of a material to carry an electric field is characterized by the permittivity of free space ($\sigma_0$), as described by Equation 2 below.

$$\sigma_0 = \frac{D}{E} = 8.85 * 10^{-12} \frac{F}{m}, \qquad \text{Equation 2.}$$

The permittivity of free space is over one hundred and forty-one thousand (141,000) times smaller than the permeability of free space. Thus, in order for electric field machines to reach equivalent field densities and/or stress as those of magnetic field machines, and permittivity being an operative material property, it must overcome this substantial material hurdle without failing.

While seemingly simple, the ability to generate and control the positive-negative charges in an electric field machine, sometimes called an electrostatic field when used in machinery, for use in practical machines such as motors and generators has previously been unachievable. However, experimentation with electric field technology has been attempted on numerous occasions, first in 1901 by H. Ho at TIU, again in 1933 by J. Trump at MIT, and more recently in 1971 by O. Jefimenko at WVU.

Previously, this limiting material permittivity property in combination with low dielectric strength, which is a measure of a material's ability to withstand an electric field without breakdown, of a system, has resulted in a poor ability to generate and contain electric fields of sufficient magnitude to be of beneficial use for large power electro-mechanical applications. When attempting to achieve the necessary high electric fields that are required for large power electro-mechanical applications, the low permittivity property in combination with low dielectric strength causes electric field machines to breakdown, which is an unstoppable avalanche arcing process that occurs when the applied electric field strength exceeds the maximum field strength of the surrounding medium, forcing the medium to conduct. Due to one or more of these material limitations that has precluded development for over a century, there is a common belief that large power machinery, on a scale useful for industry, can only be created using magnetic fields.

Prior art researchers of electric field machines may have considered electric field machines based on charge transfer as a way to minimize the electric field containment issue. Electric field charge transfer machines can apply charges to various machine elements via mechanical contacts. Because a mechanical contact transfers a charge of the same polarity to an isolated machine element, the machine element can be repelled from the mechanical contact. A charge transfer type electrostatic machine can include a spark-gap machine, like that considered by Franklin, or the usage of corona to transfer charge. The spark-gap electrostatic machine can use a brush-like contact to transfer a charge to a conductive element. Similarly, the corona electrostatic machine can use a needle or needle-like component to create charged ions that are deposited on an insulating element. In either case, a stationary contact of opposite polarity to the charge depositing contact and positioned some distance away from it, is used to neutralize the charge on the isolated mobile element. However, charge transfer and charge neutralization can create heat and can be inefficient processes. An alternative electric field machine can use a process called electrostatic induction, whereby an external electric field can be used to induce charges in a conductive body to redistribute, in order to create force, torque or energy. An electrostatic induction machine can produce force, torque or energy in relation to the capacitance of the machine.

Using recent advancements in dielectric materials and precision manufacturing, electric field machines, including electrostatic induction machines, that overcome the prior $\sigma_0$ limitations can now be economically viable. As described herein, when electric field technologies are employed in electric field machinery, such as generators and motors, they can provide numerous benefits, including the efficient and economical generation, transmission, distribution and consumption of HVDC power. Electric field machines can also use lower density materials to lower the machine's weight, they can also use lower cost materials and they can require lower cost processing per unit. These advantages can allow for the economical use of HVDC for shorter transmission distances while still maintaining high efficiency.

The efficiency of magnetic field based machines operating at low speeds or loads can decrease because heating losses (a.k.a $I^2R$ losses) occur, even at zero speed such as in a locked rotor condition. In contrast, the efficiency of an electric field machine can not decrease at low speeds or loads because current can primarily occur during charging and discharging of the electric field machine. For this reason, $I^2R$ losses of an EFT machine can decrease at low speed or loading. Also, the electric field machine can eliminate the need for back-iron (yoke) that magnetic field machines require, because the divergence of the electric field is not zero, and so it can eliminate core losses and use less material volumetrically.

Further, electric field machines can have higher capacity factor (CF) values than traditional magnetic field machines. For example, an EFT generator with higher efficiency at low speeds can improve the CF of a wind turbine by harnessing more wind energy during low wind speed conditions. FIG. 3 illustrates possible wind turbine efficiency curves of various prior art magnetic systems and an EFT system versus wind speed. Electric field machines can also allow greater versatility for utility scale generators. For example, a large utility power company can use their magnetic induction based generators to meet their base load power needs. Traditionally, deviation in the output power of their base load generators, which is based on magnetic induction, would result in decreased performance and economic value of the generator. A primary reason for this lower value can be due to lower efficiency of the magnetic field induction generator at any operating point other than its rated operating point. In contrast, an EFT generator can not lose economic value if operated at a point lower than its rated value, because its efficiency can increase at lower speeds or loads. This higher economic value may allow utilities to modulate base load production allowing companies to better implement variable energy sources, such as renewable energy sources. FIG. 4 illustrates exemplary efficiency versus percent rated load curves for traditional magnetic field generators and EFT generators.

SUMMARY OF THE DISCLOSURE

The subject innovation relates to methods, devices, or systems for high voltage direct current power generation using electric field technology and electrostatic induction. An exemplary embodiment of the present invention provides a method of generating a high voltage direct current using an electric-field generator. The electric field generator can comprise a rotor member, a plurality of rotor poles coupled to the rotor member, a plurality of stator poles corresponding to the rotor poles, and a dielectric medium positioned between the corresponding stator and rotor poles. The method can comprise applying an electric field between corresponding stator and rotor poles, receiving a mechanical energy input causing the rotor member to rotate, changing an alignment of the corresponding stator and rotor poles as a result of the rotation of the rotor member, increasing the voltage of the electric field between the corresponding stator and rotor poles as a result of the alignment change of the corresponding stator and rotor poles, and discharging the electric field to place a charge on a DC bus when the voltage of the electric field reaches a predetermined level.

In some embodiments, the plurality of stator poles can be located on a perimeter of a plurality of stator plates.

In some embodiments, corresponding stator poles of adjacent stator plates can be electrically coupled to one another.

In some embodiments, stator poles on the same stator plate are electrically isolated from one another.

In some embodiments, the method can further comprise transmitting a direct current on the DC bus to a substation.

In some embodiments, the voltage of the transmitted direct current is not increased with a step-up transformer.

In some embodiments, the voltage of the transmitted direct current is at least 100 volts. In some embodiments, the voltage of the transmitted direct current is at least 10,000 volts. In some embodiments, the voltage of the transmitted direct current is at least 50,000 volts. In some embodiments, the voltage of the transmitted direct current is at least 100,000 volts.

In some embodiments, the dielectric medium between the stator and rotor poles is a liquid.

In addition to methods, the present invention also provides systems for generating high voltage direct current. In an exemplary embodiment of the present invention, the system comprises a plurality of stator poles corresponding to the rotor poles, a plurality of rotor poles, a dielectric medium positioned substantially between the rotor and stator poles, a voltage source, a rotor member, and a DC bus. The voltage source can be configured to apply an electric field between the corresponding stator and rotor poles. The rotor member can be coupled to a mechanical energy input source and the plurality of rotor poles. The rotor member can be configured to rotate as a result of mechanical energy, wherein rotation of the rotor member changes alignment of the corresponding stator and rotor poles to increase a magnitude of the electric field between the corresponding stator and rotor poles. The DC bus can be configured to receive a charge from the corresponding stator and rotor poles when the magnitude of the electric field between the corresponding stator and rotor poles reaches a predetermined level.

In some embodiments, the plurality of stator poles are located on a perimeter of a plurality of stator plates.

In some embodiments, corresponding stator poles of adjacent stator plates are electrically coupled to one another.

In some embodiments, stator poles on the same stator plate are electrically isolated from one another.

In some embodiments, the system can further comprise a substation electrically coupled to the DC bus.

In some embodiments, the system does not include a step-up transformer for increasing the voltage of the current on the DC bus.

In some embodiments, a voltage of transmitted direct current on the DC bus is at least 100 volts. In some embodiments, a voltage of transmitted direct current on the DC bus is at least 10,000 volts. In some embodiments, a voltage of transmitted direct current on the DC bus is at least 50,000 volts. In some embodiments, a voltage of transmitted direct current on the DC bus is at least 100,000 volts.

In some embodiments, the dielectric medium between the stator and rotor poles is a liquid.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

This disclosure relates to machines such as motors, generators, actuators, sensors and the like that primarily use the electric field and electrostatic induction to produce useful force, torque or energy. The use of the electric field to produce useful force, torque or energy will be called electric field technology (EFT). Further, this disclosure relates to (a) high voltage direct current (HVDC) power generation using EFT machines, (b) machines whose efficiency improves at slow speeds or loads, and (c) materials and manufacturing techniques that permit electric field machines to operate effectively or efficiently. Embodiments of the present invention can employ various EFT machines, including, but not limited to, the EFT machines described in U.S. application Ser. Nos. 13/887,308 and 14/138,004, which are hereby incorporated by reference in their entireties as if fully set forth below There are many benefits of electrostatic induction based EFT for producing HVDC over traditional magnetic AC systems. First, the use of AC transformers and AC substations can be reduced or eliminated, which can result in power losses below about four percent (4%) per conversion step (i.e. transformer or DC to AC converter station) and reducing installation costs. Second, the tie-in of new EFT generators producing HVDC can no longer require voltage phases to be synchronized, simplifying the design. Third, HVDC cables can be designed using two or fewer conductors instead of three or more conductors, resulting in reduced installation costs. Fourth, the reactance loss can be reduced or eliminated, resulting in higher transmission and/or distribution efficiency by, for instance, above about ninety four percent (94%).

Figure 5:
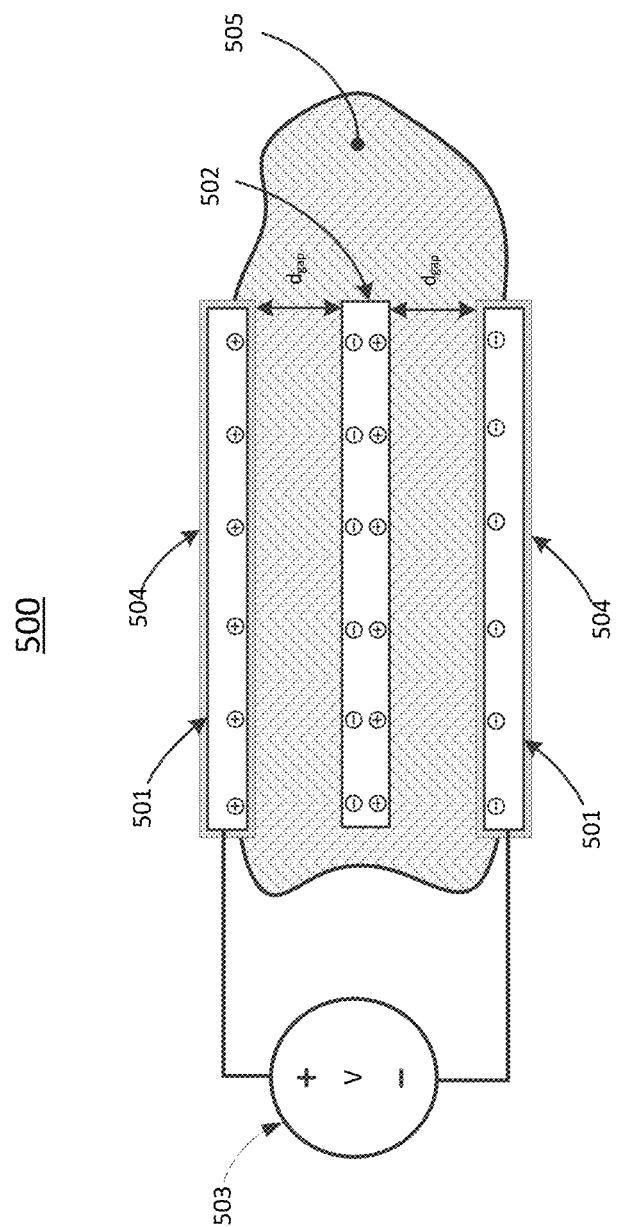
FIG. 5 illustrates a conductive rotor pole that is substantially aligned with conductive positive and negative stator poles of an electric field generator that are connected to a low voltage charge source.
Figure 6:
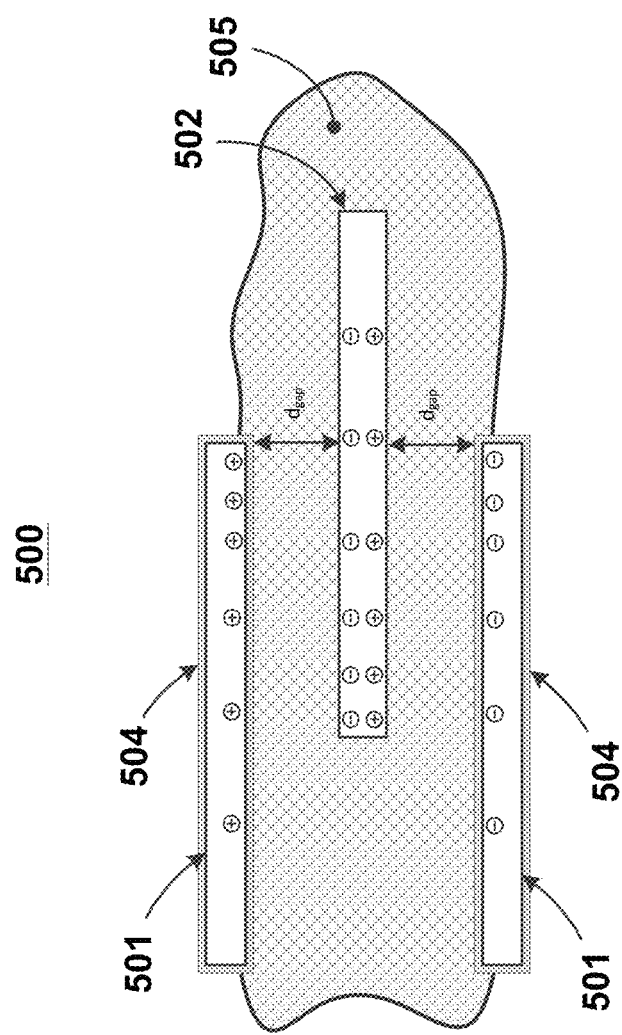
FIG. 6 illustrates a conductive rotor pole that is partially unaligned with electrically charged positive and negative stator poles of an electric field generator.
Figure 7:
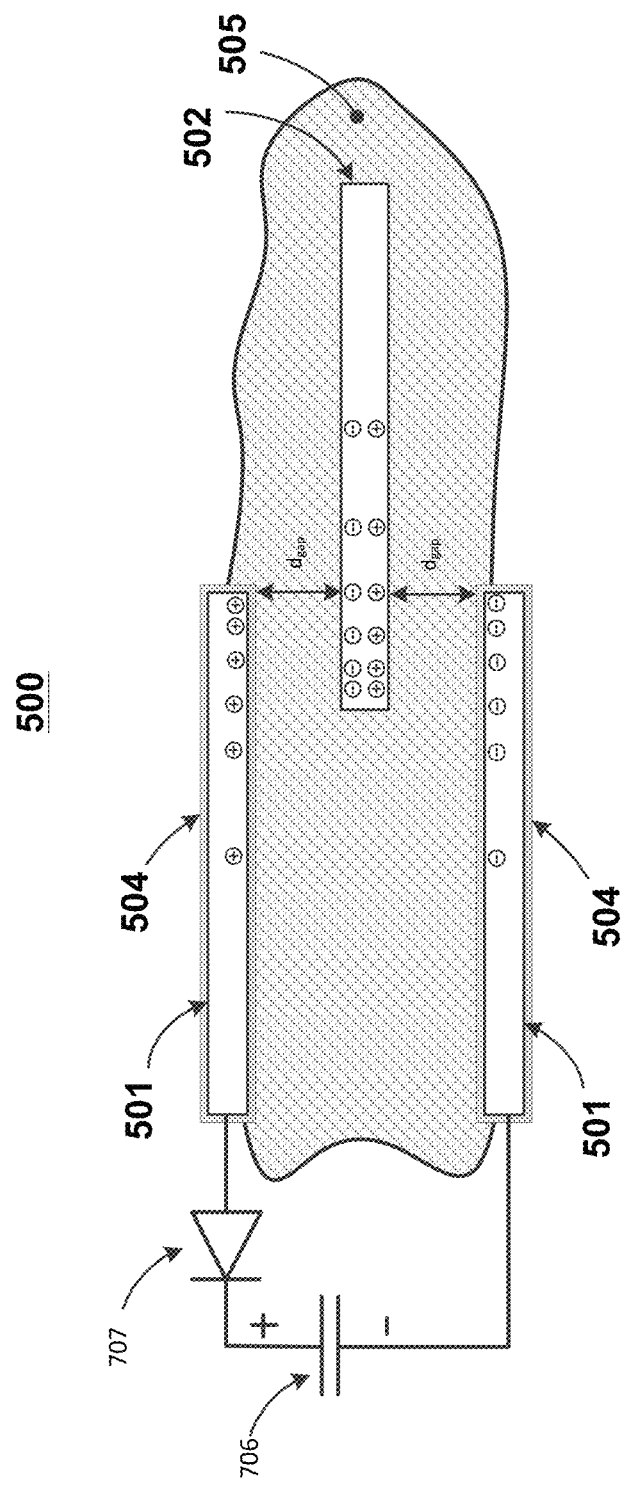
FIG. 7 illustrates a conductive rotor pole that is substantially unaligned with electrically charged positive and negative stator poles of an electric field generator that are connected to a high voltage direct current bus.

In one embodiment, a generator (or electric field machine) 500 that transforms mechanical energy from, for example, a wind turbine, into electrical energy and based on the electric field can operate based on three primary steps. First, charge from a low voltage source 503 can be applied to one or more conductive stator poles 501 while they are substantially aligned with one or more rotor pole(s) 502, as shown in FIG. 5. During this step, charges on the poles can naturally reposition to minimize stress in the gap medium 505 between the rotor 502 and stator 501 poles. Once fully charged, the low voltage source 503 can be disconnected. Second, as illustrated in FIG. 6, the source of the mechanical energy input, which can include, but is not limited to, a wind or water turbine, can move the rotor pole(s) 502 out of alignment with the charged stator pole(s) 501. This unaligning of the electrically isolated poles can increase the electric field and the associated voltage between the poles, resulting in higher energy being stored in the electric field machine because the fixed-value charges can be forced into a smaller area in order to minimize the electric field stress. A dielectric coating surrounding the poles 504 can prevent breakdown between the poles. This dielectric coating 504 can encapsulate the stator 501 and/or rotor 502 poles. Third, once a predetermined electric field strength (or voltage) has been achieved, through the unalignment of the charged stator pole(s) with the rotor pole(s), the charge can be released onto a bus. FIG. 7 illustrates a HVDC bus 706 with diode like device 707 which prevents backflow of the charge from the bus to the conductive stator 501 pole(s). Once the charge is released onto a bus, the charge can be transported long distances, for example, from an offshore wind turbine generator to an onshore substation.

In some embodiments, the low voltage charge source can include, but is not limited to, a battery, a large capacitive storage device, another generator based on either the magnetic or electric fields or grid connection, and the like.

Some embodiments of the present invention can generate voltage levels above those of many conventional machines without the use of step-up transformers, thus making it possible to harvest power from generators great distances from substations, e.g., offshore wind farms. In some embodiments, electric field technology can allow low voltage DC to be transformed to, for instance, at least one hundred volts DC ($100\ V_{DC}$), or back again, in a single step, similar to an AC magnetic transformer. In some embodiments, electric field technology can allow low voltage DC to be transformed to, for instance, at least 50 kilovolts DC ($50\ k\ V_{DC}$), or back again, in a single step, similar to an AC magnetic transformer. In some embodiments, electric field technology can allow low voltage DC to be transformed to, for instance, at least 100 kilovolts DC ($100\ k\ V_{DC}$), or back again, in a single step, similar to an AC magnetic transformer.

In some embodiments, an EFT machine can produce, for instance, pulsed HVDC, but also use high phase count and simple passive filtering to smooth the bus voltage to substantially DC. In one example, traditional sinusoidal outputs are possible with electric field machines, but at the expense of lower energy density. Various embodiments of the present invention can be applied to power generation systems such as wind farm systems, other renewable energy systems and traditional power generation systems, including steam turbines.

Figure 1:
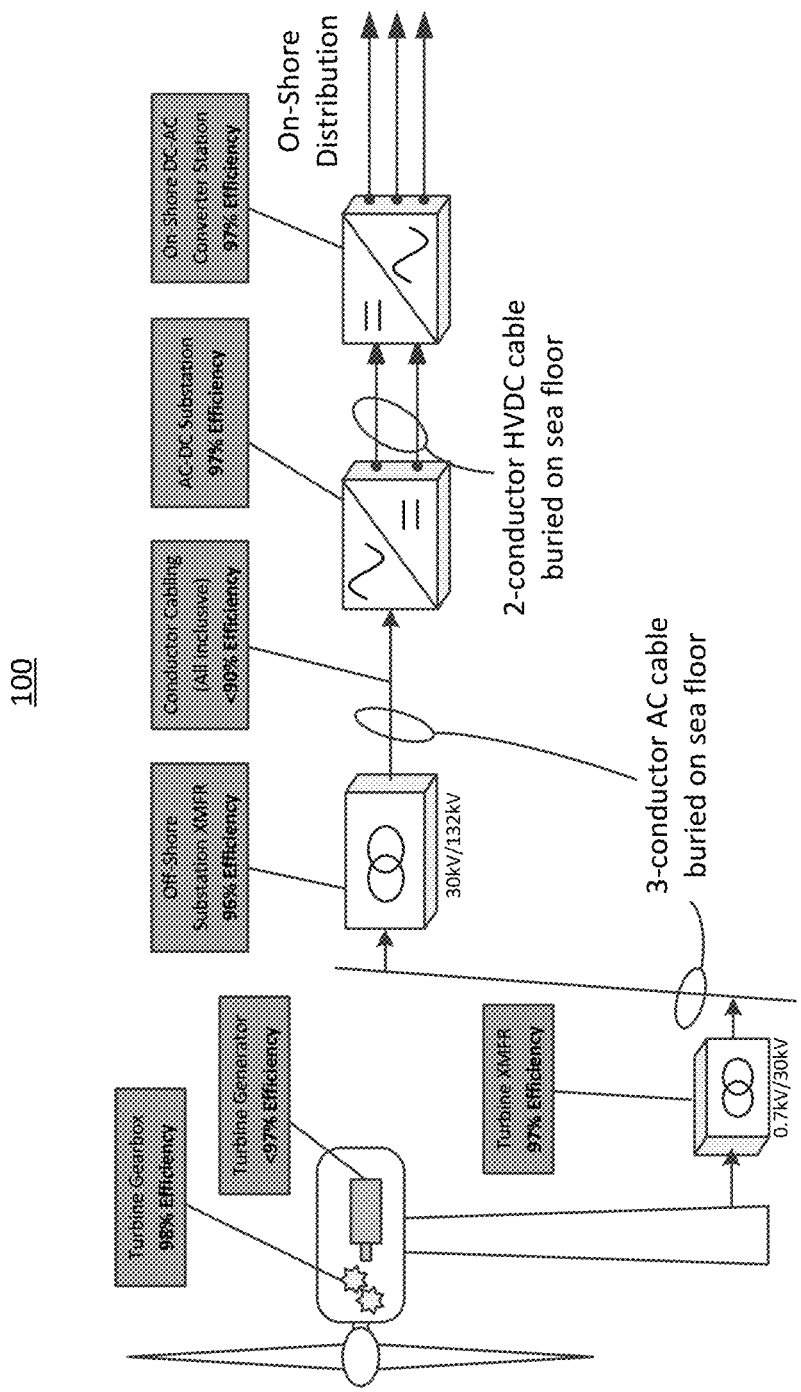
FIG. 1 illustrates a prior art system for high voltage direct current power generation.
Figure 2:
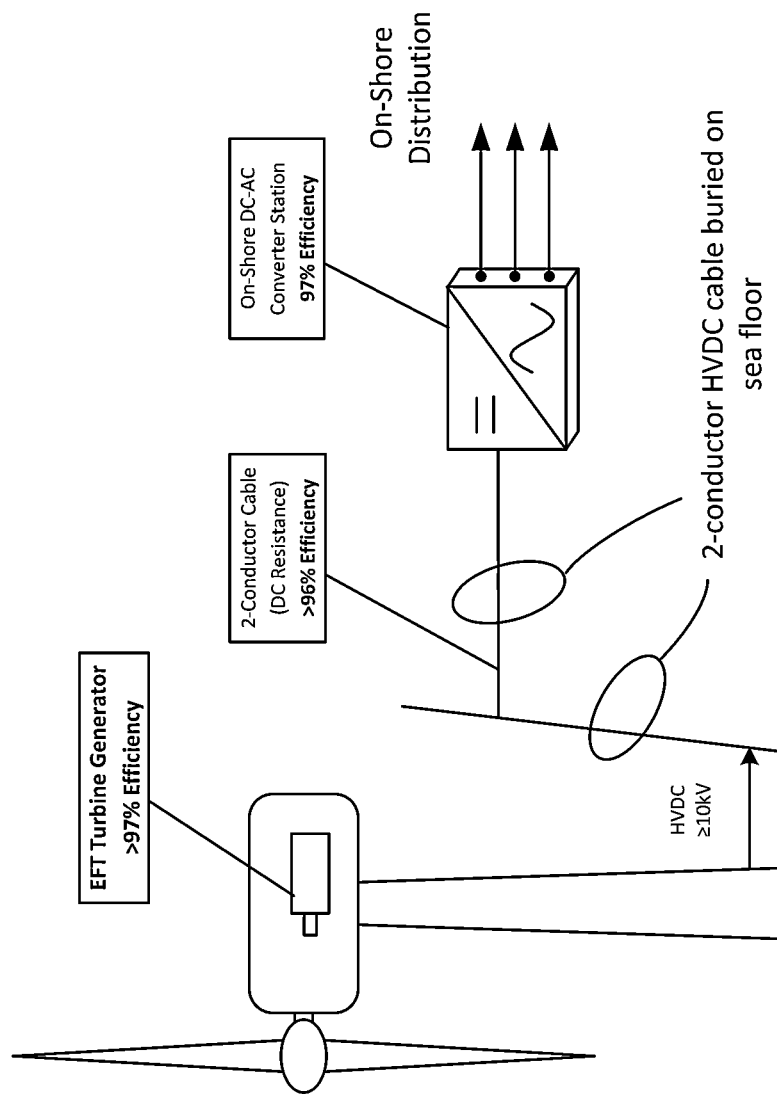
FIG. 2 illustrates a system for generating HVDC from a direct drive, EFT generator and a converter station for transmitting AC power.
Figure 3:
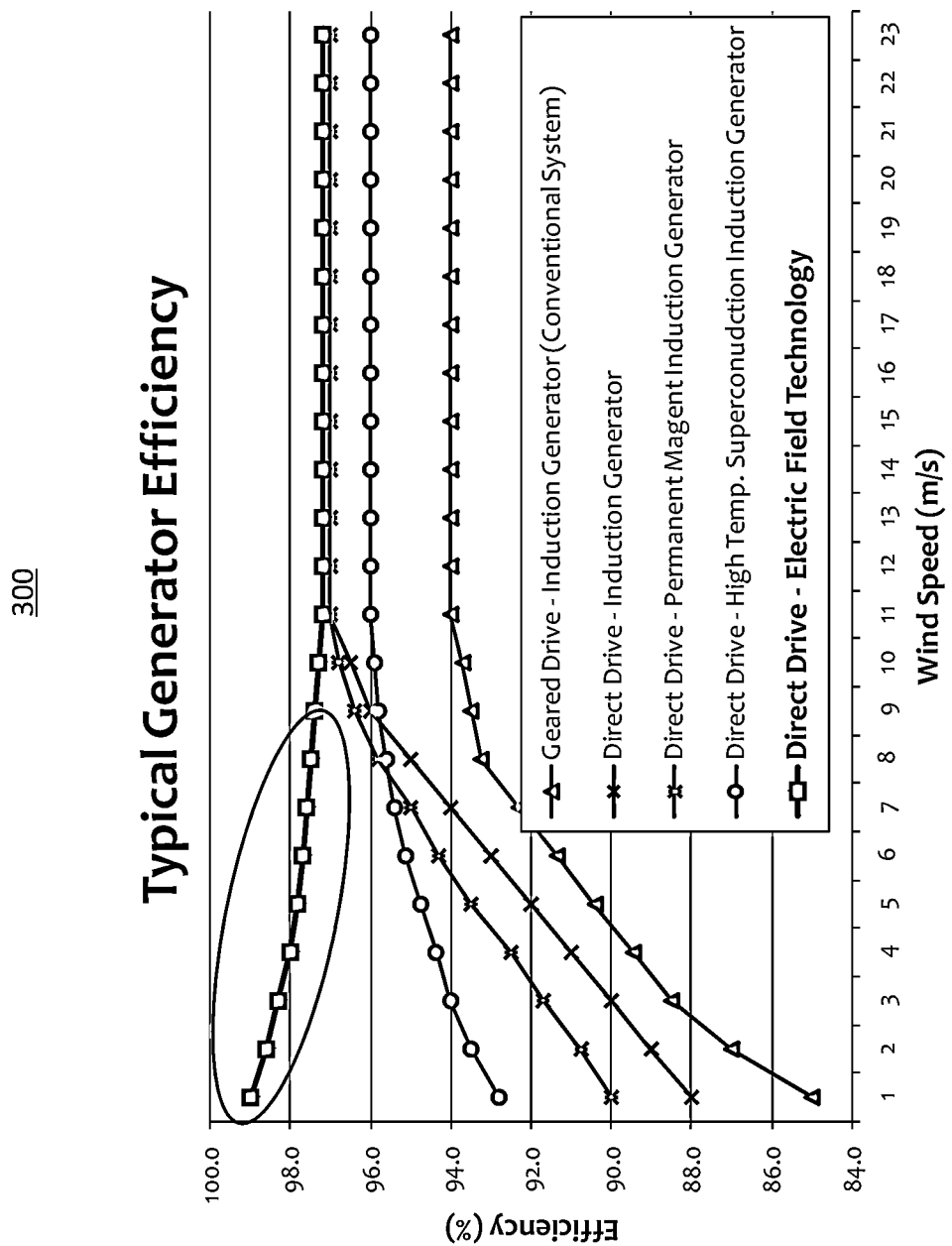
FIG. 3 shows a graph of generator efficiency for another embodiment of a system for high voltage direct current power generation using electric field technology, including a comparison of generator efficiency to other technologies.
Figure 4:
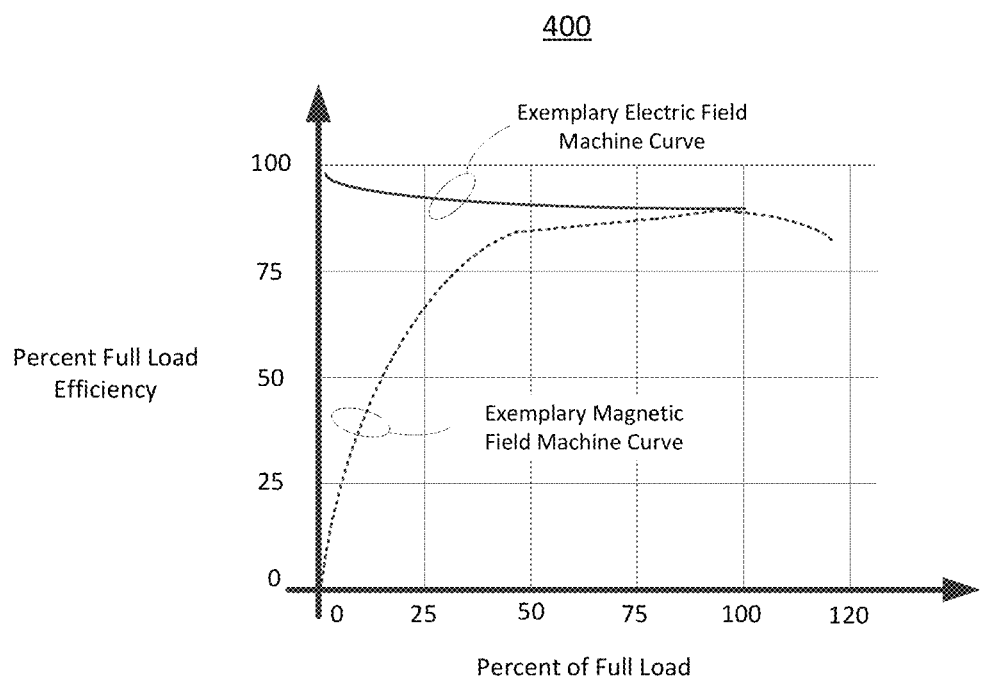
FIG. 4 shows an exemplary graph of efficiency versus percent of rated load for a magnetic induction machine and electric field machine.

FIG. 2 illustrates one embodiment of a system 200 for HVDC power generation using electric field technology with various aspects described herein. Electric field technology such as an electric field machine used in power generation systems such as a wind farm system can eliminate or reduce the use of transformers and can eliminate or reduce the need to synchronize phases. Further, electric field technology used in power generation systems can use two conductors, as opposed to three or more conductors, as are typical for traditional three-phase magnetic based systems. For these reasons, a power generation system, such as a wind farm using electric field technology, can need only two couplings. In one example, a first coupling can be from a turbine to a trunk line and a second coupling can be from the trunk line to a converter station, such as an onshore converter station. The converter station can be substantially based on semiconductor switches or rotary converters FIG. 3 illustrates another advantage of a system 200 for high voltage direct current power generation using electric field technology with various aspects described herein. Unlike a magnetic field machine that utilizes coils of copper to carry current to induce a magnetic field, an electric field machine, which can also be referred to as an electrostatic machine, stores an electrical charge (electrons) to use its inherent electric field, which can also be referred to as electrostatic field. Since the charge is only in motion during charging and discharging, the electrical current of an electric field machine can be smaller than that of a magnetic field machine. In one example, the electrical current of an electric field machine can be about an order of magnitude smaller than the electrical current of a magnetic field machine generating an equivalent amount of power. Because heat loss is proportional to current ($I^2R$), the heat loss of an electric field machine can be smaller than that of a magnetic field machine. In one example, the heat loss of an electric field machine can be about an order of magnitude smaller than the heat loss of a magnetic field machine generating an equivalent amount of power. For these reasons, among others, the electric field machine can have higher efficiencies over its rated operating range than a magnetic field machine generating an equivalent amount of power.

FIG. 3 is a graph 300 of generator efficiency for another embodiment of a system for HVDC power generation using electric field technology, including a comparison of generator efficiency to other technologies. Because of the inherent efficiency of electric field machines and the reduced reactance loss on the two conductor cabling, a total power generation efficiency, such as for a wind farm system, can be greater than about ninety percent (90%).

Current only exists in an electric field machine during charging and discharging. Thus, the electric field machine can achieve increased efficiency at low speeds and loads, which can be beneficial for wind farms and the like. A magnetic field machine, in contrast, can have lower efficiency at low rotation speeds and loads than an electric field machine generating an equivalent amount of power, which can be a significant disadvantage when using magnetic field machines for power generation systems such as wind farms.

In another embodiment, with lower electric currents and heat than a magnetic field machine, an electric field machine can be able to function with only a thin layer of conductive material, such as aluminium, copper or the like, rather than the use of copper coils in magnetic-based generators, which can be dense and expensive. In operation, such thin conductive layer can need to be held in alignment with respect to another conductive layer, but because alignment can be the only constraint, numerous substrate materials such as glass, ceramic, plastics and the like can be used. Such materials can not be used for induction motors.

In another embodiment, operation of an electric field machine, which can be configured to include a motor, a generator, an actuator, a sensor and other elements, can be based on the ability to develop high electric fields in a gap between a stationary part, such as a stator plate, and a moving part, such as a rotor plate. Modern materials such as oxide coatings such as $TiO_2$, $AlO_2$, $ZrO_2$, PZT, PZLT, and the like, electro-active polymers such as PVDF, ZnO-PVDF and the like and nano-composite materials such as nano-SiO2 in epoxy are examples of coating materials that can have high dielectric field strength or high dielectric constants.

In another embodiment, materials and manufacturing techniques can be used to achieve torque density greater than about thirty-five Newton-meters per kilogram (35 Nm/kg) and power density greater than about forty-five Watts per kilogram (45 W/kg). This allows electric field machines to be smaller in size than magnetic field machines having similar power generation capability. In addition, the vast range of modern construction materials, such as formable ceramics and high strength injection moldable plastics for substrates, can allow higher strengths while lowering motor and generator weights by about at least thirty percent (30%) when compared to traditional magnetic machines of equivalent ratings, while also offering excellent chemical and environmental resistance.

Furthermore, because an electric field machine can use statically held charges that do not create heat, only a thin conduction layer can be needed for its operation. In contrast, larger copper coils can be required in magnetic field machines to withstand the generated heat. Thus, the weight of electric field machines can be less since they use fractional amounts of dense materials, such as copper and steel, compared to magnetic field machines. Fabrication of an electric field machine can be a matter of layering coated PCB-like components and plugging, rather than soldering, them together, which can allow for automated manufacturing. Further, such modular construction of the electric field machine can permit lower cost fabrication and easier repair than traditional magnetic machines.

Figure 8A:
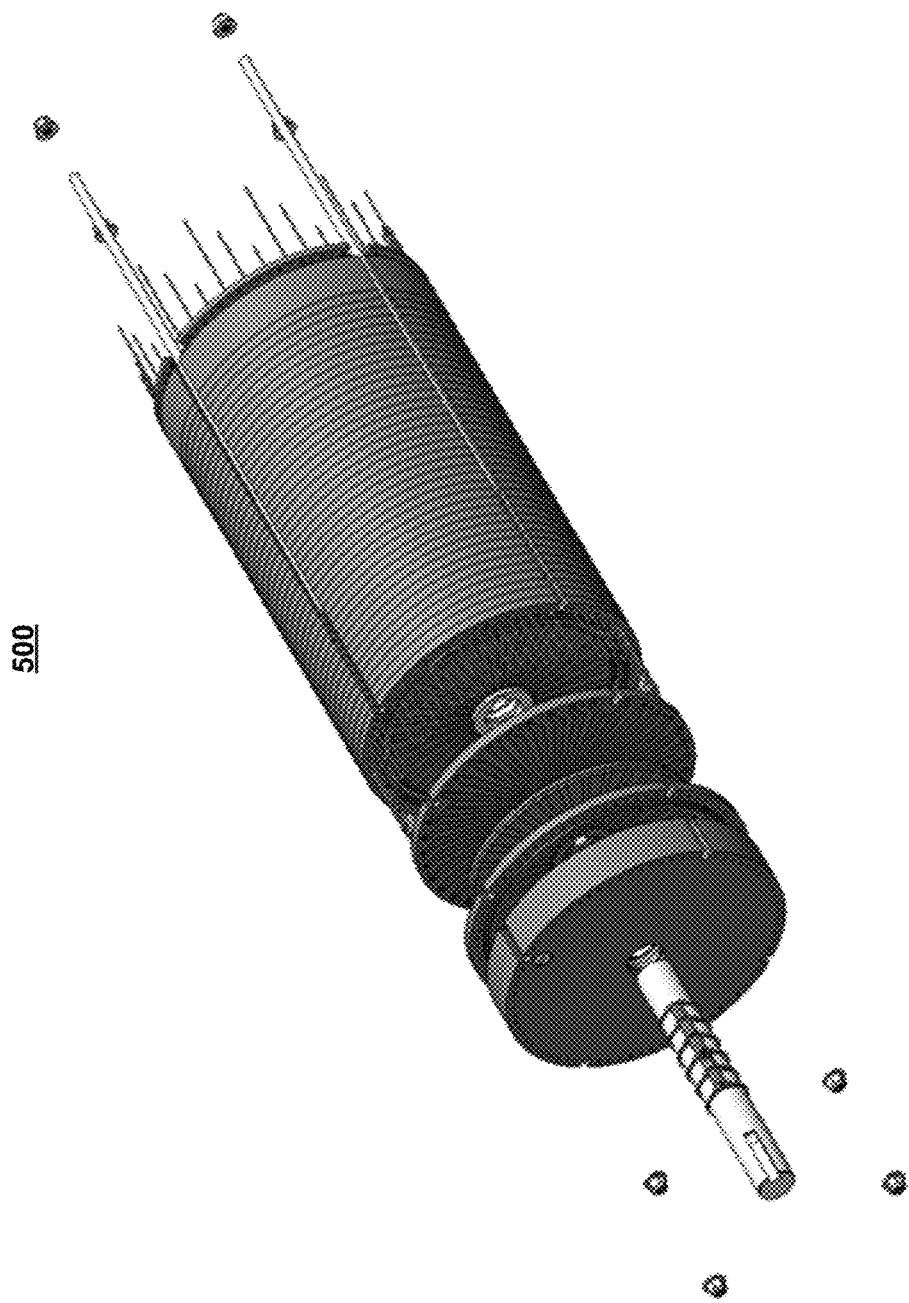
FIG. 8A illustrates an exploded perspective view of one embodiment of an electric field machine in accordance with various aspects as set forth herein.

FIG. 8A illustrates an exploded perspective view of one embodiment of an electric field machine 500 in accordance with various aspects as set forth herein. The electric field machine 800 can be fabricated using adapted applications of printed circuit board (PCB) manufacturing technology or engraving technology. By combining elements such as conductive or dielectric coating technologies, rapid population manufacturing processes such as those used in the PCB industry, modern high strength substrate materials and high voltage controls, all or a portion of the electric field machine can be assembled using automated manufacturing.

Figure 8B:
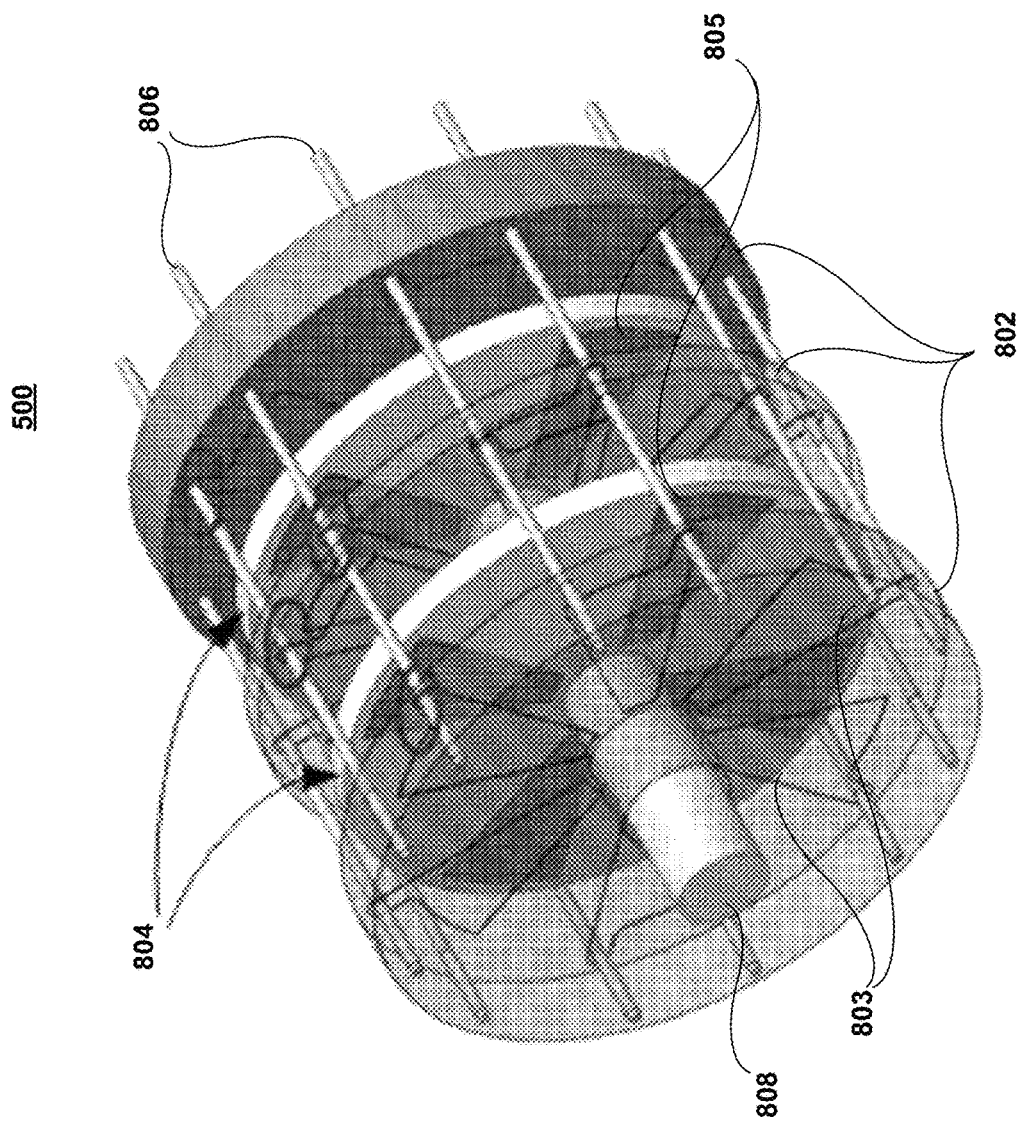
FIG. 8B illustrates a perspective view of one embodiment of an electric field machine in accordance with various aspects as set forth herein.

Referring to FIG. 8B, the electric field machine 500 may be configured to include a plurality of stator plates or stator members 802 and a rotor member 804. Each of the plurality of stator members 802 may include a plurality of stator poles 803 that are conductive, and each stator pole 803 may be electrically isolated. In some embodiments, adjacent stator members 802 may be connected by one or more connection rods 806, which may prevent the stator members 802 from rotating with respect to one another. The rotor member 804 may include a plurality of rotor poles 805, and each of the plurality of rotor poles 805 may be conductive. In some embodiments, the rotor member 804 may be secured to a shaft member 808 such that the rotor member 804 can be rotated in conjunction with rotation of the shaft member 808.

Figure 9:
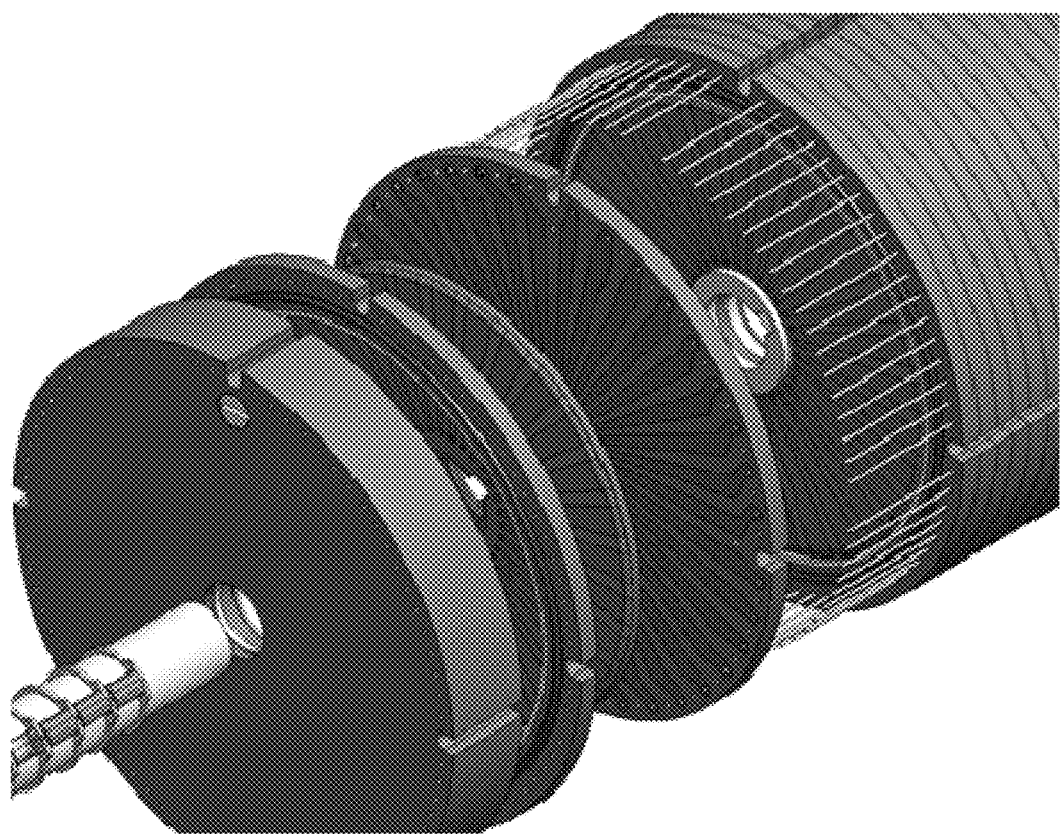
FIG. 9 illustrates a portion of an exploded perspective view of another embodiment of an electric field machine in accordance with various aspects as set forth herein.
Figure 10:
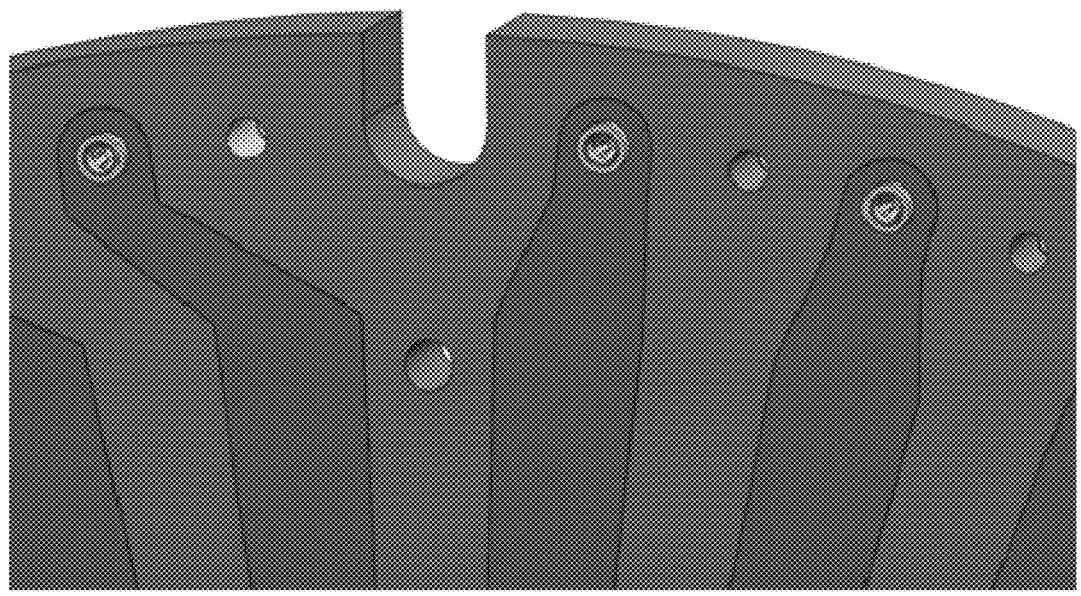
FIG. 10 illustrates a portion of a perspective view of one embodiment of a stator plate of an electric field machine in accordance with various aspects as set forth herein.
Figure 11:
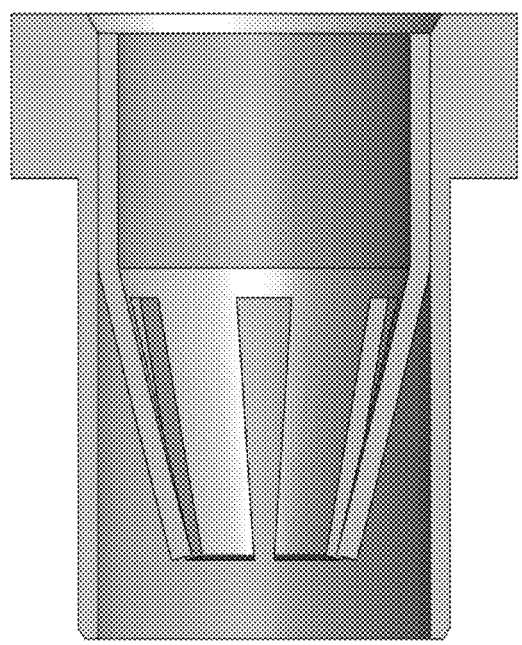
FIG. 11 illustrates a longitudinal cross-sectional view of one embodiment of a connector of a stator plate of an electric field machine in accordance with various aspects as set forth herein.

FIGS. 9, 10 and 11 show examples of an electric field machine using PCB pin connectors to couple stator poles of the electric field machine. FIG. 9 illustrates a portion of an exploded perspective view of another embodiment of an electric field machine 500 in accordance with various aspects as set forth herein. FIG. 10 illustrates a portion of a perspective view of one embodiment of a stator plate 1000 of an electric field machine 500 in accordance with various aspects as set forth herein. FIG. 11 illustrates a longitudinal cross-sectional view of one embodiment of a connector 1100 of a stator plate 1000 of an electric field machine 500 in accordance with various aspects as set forth herein. In one example, the connector 1100 is a PCB pin connector. The connectors 1100 can be placed on their respective boards, such as a stator plate using rapid populating machines commonly used in the PCB industry.

Figure 12:
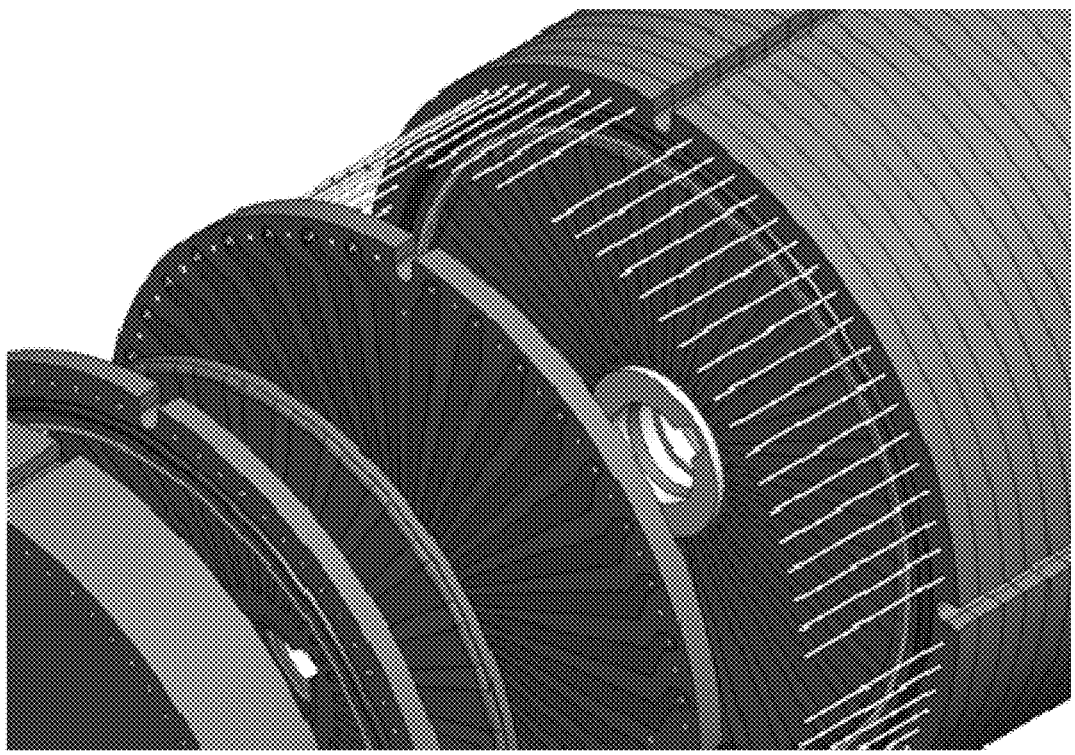
FIG. 12 illustrates a portion of an exploded perspective view of another embodiment of an electric field machine showing pole couplings between stator plates in accordance with various aspects as set forth herein.
Figure 13:
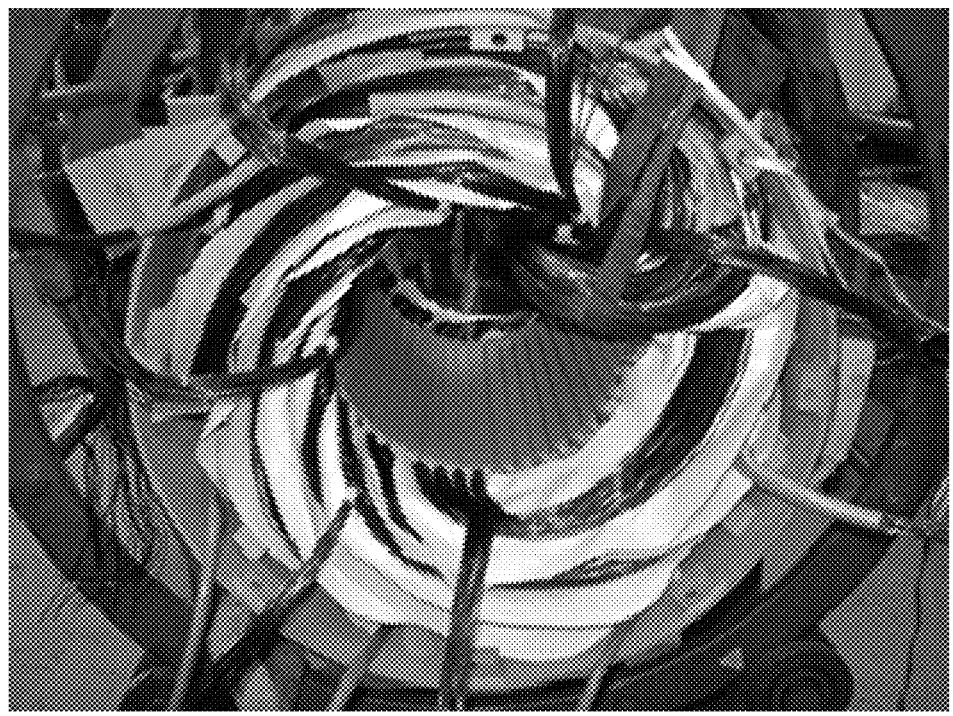
FIG. 13 illustrates pole cabling for a prior art induction machine.

FIGS. 12 and 13 illustrate differences between an electric field machine and a magnetic field machine. FIG. 12 illustrates a portion of an exploded perspective view of another embodiment of an electric field machine 500 showing pole couplings between stator plates in accordance with various aspects as set forth herein. FIG. 12 shows metal pins longitudinally traversing the length of the electric field machine 500 to couple desired poles of each stator plate. In one example, each metal pin can be coupled to a pole of each stator plate using a connector.

For comparison, FIG. 13 illustrates pole cabling for a prior art induction machine. FIG. 13 shows copper coils after they have been interlaced into steel laminations, but before they have been made into cables or resin impregnated for rigidity.

The previous detailed description is merely illustrative in nature and is not intended to limit the present disclosure, or the application and uses of the present disclosure. Furthermore, there is no intention to be bound by any expressed or implied theory presented in the preceding field of use, background or summary of the disclosure or the following detailed description. The present disclosure provides various examples, embodiments and the like, which can be described herein in terms of functional or logical block elements. Various techniques described herein can be used for high voltage direct current power generation using electric field technology. The various aspects described herein are presented as methods, devices (or apparatus), systems, or articles of manufacture that can include a number of components, elements, members, modules, nodes, peripherals, or the like. Further, these methods, devices, systems, or articles of manufacture can include or not include additional components, elements, members, modules, nodes, peripherals, or the like.

Throughout the specification and the claims, the following terms take at least the meanings explicitly associated herein, unless the context clearly dictates otherwise. Relational terms such as "first" and "second," and the like can be used solely to distinguish one entity or action from another entity or action without necessarily requiring or implying any actual such relationship or order between such entities or actions. The term "or" is intended to mean an inclusive "or" unless explicitly stated otherwise herein. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within ten percent (10%), in another embodiment within five percent (5%), in another embodiment within one percent (1%) and in another embodiment within five-tenths percent (0.5%). The term "coupled" as used herein is defined as connected, although not necessarily directly and not necessarily mechanically. A device or structure that is "configured" in a certain way is configured in at least that way, but can also be configured in ways that are not listed.

In the previous description, numerous specific details are set forth. However, it is to be understood that embodiments of the disclosed technology can be practiced without these specific details. References to "one embodiment," "an embodiment," "example embodiment," "various embodiments," and other like terms indicate that the embodiments of the disclosed technology so described can include a particular function, feature, structure, or characteristic, but not every embodiment necessarily includes the particular function, feature, structure, or characteristic. Further, repeated use of the phrase "in one embodiment" does not necessarily refer to the same embodiment, although it can.

It is important to recognize that it is impractical to describe every conceivable combination of components or methodologies for purposes of describing the claimed subject matter. However, a person having ordinary skill in the art will recognize that many further combinations and permutations of the subject innovations are possible. Accordingly, the claimed subject matter is intended to cover all such alterations, modifications and variations that are within the spirit and scope of the claimed subject matter.

Although the present disclosure describes specific examples, embodiments, and the like, various modifications and changes can be made without departing from the scope of the present disclosure as set forth in the claims below. For example, although the example methods, devices and systems described herein are in conjunction with an electrostatic machine, the skilled artisan will readily recognize that the example methods, devices and systems can be used in other methods, devices and systems and can be configured to correspond to such other example methods, devices and systems as needed. Further, while at least one example, embodiment, or the like is presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A method of generating a high voltage direct current using an electric-field generator, the electric field generator comprising a rotor member fixedly connected to a shaft member, the rotor member comprising a plurality of electrically conductive and substantially electrically isolated rotor poles having substantially no net charge, a plurality of electrically conductive stator poles corresponding to the rotor poles, and a dielectric medium positioned between the corresponding stator and rotor poles, the method comprising:

applying charges from a voltage charge source to a subset of stator poles of the plurality of stator poles that are aligned with a subset of rotor poles of the plurality of rotor poles, the voltage charge source having a voltage that is less than a voltage of at least one of a DC bus and DC load;

responsive to determining that charging of the subset of stator poles has reached a predetermined amount of charge, electrically disconnecting the voltage charge source from the subset of stator poles;

receiving a mechanical energy input causing the rotor member to rotate such that an alignment of the corresponding subset of stator poles and subset of rotor poles is changed, wherein the changed alignment of the corresponding subset of stator poles and the subset of rotor poles increases a voltage of an electric field between the corresponding subset of stator poles and subset of rotor poles; and subsequent to the voltage of the electric field between the corresponding subset of stator poles and subset of rotor poles reaching a predetermined level, electrically connecting the subset of stator poles to the at least one of the DC bus and DC load and discharging the subset of stator poles.

2. The method of claim 1, wherein the plurality of stator poles is located on a perimeter of a plurality of stator plates.

3. The method of claim 2, wherein corresponding stator poles of adjacent stator plates are electrically coupled to one another.

4. The method of claim 2, wherein stator poles on the same stator plate are electrically isolated from one another.

5. The method of claim 1, further comprising transmitting a direct current on the DC bus to a substation.

6. The method of claim 5, wherein the voltage of the transmitted direct current is not increased with a step-up transformer.

7. The method of claim 6, wherein the voltage of the transmitted direct current is at least 100 volts.

8. The method of claim 1, wherein the dielectric medium between the stator and rotor poles is a liquid.

9. The method of claim 1, wherein the electric-field generator is configured to create a voltage of at least 100kV that is substantially direct current without use of a step-up transformer.

10. A system for generating a high voltage direct current using an electric-field generator, comprising:

a rotor member comprising a plurality of electrically conductive and substantially electrically isolated rotor poles having substantially no net charge;

a plurality of electrically conductive stator poles corresponding to the plurality of rotor poles;

a dielectric medium positioned substantially between corresponding stator and rotor poles;

a voltage charge source configured to (i) apply charges to a subset of stator poles of the plurality of stator poles that are substantially aligned with a subset of rotor poles of the plurality of rotor poles until the subset of stator poles have a predetermined amount of charge and (ii) electrically disconnect from the subset of stator poles after the subset of stator poles have the predetermined amount of charge;

a shaft member such that rotation of the shaft member causes rotation of the rotor member, wherein rotation of the rotor member changes alignment of the charged subset of stator poles and the subset of rotor poles to increase a magnitude of the electric field between the corresponding subset of stator poles and subset of rotor poles; and a DC bus configured to receive a charge from the corresponding stator and rotor poles when the magnitude of the electric field between the corresponding subset of stator poles and subset of rotor poles reaches a predetermined level.

11. The system of claim 10, wherein the plurality of stator poles is located on a perimeter of a plurality of stator plates.

12. The system of claim 11, wherein corresponding stator poles of adjacent stator plates are electrically coupled to one another.

13. The system of claim 11, wherein stator poles on the same stator plate are electrically isolated from one another.

14. The system of claim 10, further comprising a substation electrically coupled to the DC bus.

15. The system of claim 10, wherein the system does not include a step-up transformer for increasing the voltage of the current on the DC bus.

16. The system of claim 15, wherein a voltage of transmitted direct current on the DC bus is at least 100 volts.

17. The system of claim 10, wherein the dielectric medium between the stator and rotor poles is a liquid.

18. The system of claim 10, wherein the electric-field generator is configured to create a voltage of at least 100kV that is substantially direct current without use of a step-up transformer.

* * * * *